United States Patent [19]

Goscenski, Jr.

[11] 4,446,697
[45] May 8, 1984

[54] HYDRAULIC FAN DRIVE SYSTEM INCLUDING VARIABLE DISPLACEMENT PUMP

[75] Inventor: Edward J. Goscenski, Jr., Battle Creek, Mich.

[73] Assignee: Eaton Corporation, Cleveland, Ohio

[21] Appl. No.: 100,077

[22] Filed: Dec. 4, 1979

Related U.S. Application Data

[63] Continuation-in-part of Ser. No. 907,064, May 18, 1978, Pat. No. 4,179,888.

[51] Int. Cl.³ .............................................. F01P 7/16
[52] U.S. Cl. .................................... 60/443; 60/450; 60/452; 123/41.12; 137/101; 236/35
[58] Field of Search .................. 60/443, 450, 452; 123/41.12; 137/101; 236/35

[56] References Cited

U.S. PATENT DOCUMENTS

| | | | |
|---|---|---|---|
| 2,238,061 | 4/1941 | Kendrick | 60/450 X |
| 2,777,287 | 1/1957 | Tweedale | 60/396 |
| 3,182,912 | 5/1965 | Weisenbach | 236/35 |
| 3,486,334 | 12/1969 | Miller | 60/450 |
| 3,659,567 | 5/1972 | Murray | 123/41.12 |
| 3,664,129 | 5/1972 | Schwab | 60/451 |
| 3,942,486 | 3/1976 | Kirchner | 123/41.12 |
| 4,036,432 | 7/1977 | George | 236/35 |
| 4,062,329 | 12/1977 | Rio . | |
| 4,154,257 | 5/1979 | Adachi | 137/101 |
| 4,179,888 | 12/1979 | Goscenski, Jr. | 60/420 |
| 4,199,942 | 4/1980 | Kasper | 60/452 X |
| 4,200,146 | 4/1980 | Olson | 123/41.12 |

*Primary Examiner*—George L. Walton
*Attorney, Agent, or Firm*—C. H. Grace; F. M. Sajovec

[57] ABSTRACT

A vehicle engine accessory drive system is disclosed including a hydraulic fan motor (M) and a power steering gear mechanism (SG) in series flow relationship. The system includes a variable displacement power steering pump assembly (P) which is the sole source of fluid for the system, and includes a variable displacement pumping element (PE) and a displacement control valve (CV). The displacement control valve includes a pilot valve (35) which is responsive to the demand for cooling to vary the fluid pressure in a signal chamber (63). The displacement control valve is operable to communicate a control fluid pressure to a stroking cylinder (SC) to control the fluid delivery rate of the pumping element. At a first relatively lower temperature, the displacement control valve maintains the fluid delivery rate of the pumping element at Z, and at a second relatively higher temperature, to maintain the fluid delivery rate at X. Controlling the fluid flow rate out of the pumping element in response to demand for cooling results in a substantial savings of pump input horsepower, especially when the hydraulic fan motor is operating at the minimum fan speed.

8 Claims, 6 Drawing Figures

HYDRAULIC FAN DRIVE SYSTEM INCLUDING VARIABLE DISPLACEMENT PUMP

CROSS REFERENCE TO RELATED APPLICATION

The present application is a continuation-in-part of U.S. Pat. application Ser. No. 907,064, filed May 18, 1978, now U.S. Pat. No. 4,179,888.

BACKGROUND OF THE DISCLOSURE

The present invention relates to hydraulic systems for driving the radiator cooling fans of vehicle engines, and more particularly, to such systems in which the pump supplying the pressurized fluid to the system is of the variable displacement type.

Although it will become apparent from the subsequent description that the present invention has various uses and applications, it is especially advantageous when used to drive the radiator cooling fan of a vehicle engine, and will be described in connection therewith.

Originally, radiator cooling fans were driven directly, i.e., by some form of mechanical connection between the fan and the engine crankshaft. The resulting proportionality between fan speed and engine speed may be desirable at lower engine speeds (e.g., below 3,000 rpm), but is undesirable at higher speeds where additional air flow through the radiator becomes unnecessary, wastes engine horsepower, and creates excessive noise. More recently, viscous fan drives have been developed which overcome the above-mentioned problems of excessive fan speed at higher engine speeds. Viscous fan drives of the type shown in U.S. Pat. No. 2,948,268, assigned to the assignee of the present invention, have an inherent torque-limiting characteristic such that the fan speed is generally proportional to the engine speed up to a certain speed such as 2,500 rpm, then the fan speed levels off and remains constant as engine speed and torque continue to rise. The resulting graph of fan speed versus engine speed has become known as the "viscous curve", and operation in accordance with the well known "viscous curve" is now generally a requirement of fan drive systems.

The conventional fan drive arrangements can be used only with a standard in-line engine, i.e., one having the crankshaft oriented axially. However, in recent years, there has been increasing use by the auto manufacturers of transverse mounted engines, providing front wheel drive. The attempts by those working in the art to provide a satisfactory fan drive system for use with transverse mounted engines has included many different approaches, including mechanical gear trains, electric motors, and flexible shafts.

Another major approach to the cooling of transverse engines is the use of hydraulic systems, including a hydraulic pump driven by the engine, and a hydraulic motor connected to the fan. Those attempting to design a satisfactory hydraulic fan drive system have tried to reduce the space, weight, and cost of such systems by utilizing at least one of the hydraulic components in at least two different vehicle hydraulic systems. For example, there have been frequent attempts to utilize the power steering pump to provide pressurized fluid to operate a hydraulic fan motor, as well as the power steering gear (see U.S. Pat. No. 2,777,287).

One design approached such systems has been to place the fan motor in series with the power steering gear, but upstream therefrom, such that the flow through the fan motor also passes through the steering gear (see U.S. Pat. No. 3,659,567). A major drawback of such prior art systems has been a constant flow rate through the fan motor over all engine speeds from idle to maximum, such that the fan speed is constant regardless of engine speed. Such systems usually require a relatively high fan motor pressure and pump horsepower at lower engine speeds when the pressure drop across the power steering gear is greatest, thus making it difficult to satisfy the pressure and flow requirements of both the fan motor and steering gear simultaneously.

SUMMARY OF THE INVENTION

Accordingly, it is an object of the present invention to provide a hydraulic fan drive system in which the sole source for the system is a variable displacement pumping element wherein displacement of the pumping element is varied in accordance with the demand for radiator cooling to operate the hydraulic fan motor, as a function of engine speed, in accordance with the desired viscous curve.

It is another object of the present invention to provide a hydraulic fan drive system which achieves the above-stated object, and in which the hydraulic fan motor and the power steering gear operate in a compatible manner.

The above and other objects of the present invention are accomplished by the provision of an improved vehicle accessory drive system. The system comprises an engine driven variable displacement pump including a pumping element operable to deliver fluid at a rate generally proportional to engine speed for any given displacement. The pump has fluid inlet and outlet ports and includes fluid pressure actuated means to vary the displacement of the pump. The pump comprises the sole source of pressurized fluid for the system and has a fluid delivery rate of approximately Z at engine idle and maximum pump displacement. The system includes a hydraulic fan motor having fluid inlet and outlet ports, the fluid inlet port being in series communication with the pump outlet port. The fan motor has a fan speed at engine idle corresponding to a fluid flow rate of approximately Y, and a fan peak speed corresponding to a fluid flow rate of approximately X. A flow control valve means has its inlet in fluid communication with the outlet port of the fan motor, the flow control valve means having primary and secondary fluid outlets and being operable to communicate a fluid flow rate of approximately Z from the fluid inlet to the primary outlet over substantially the entire range of operating engine speeds, and to communicate substantially all fluid flow in excess of Z from the inlet to the secondary outlet, Z being substantially less than X. An open center steering gear mechanism has inlet and outlet ports, the inlet port being in fluid communication with the primary outlet of the flow control valve means. The outlet port of the steering gear mechanism and the secondary outlet of the flow control valve means are in fluid communication with the inlet port of the pump. A control valve means is in fluid communication with the fluid outlet port of the pump and is operable to communicate a control fluid pressure to the pressure actuated means of the pump. The control valve means includes valve means responsive to the demand for cooling and being operable (1) at a first relatively lower temperature to communicate a control fluid pressure to maintain the fluid delivery rate of the pump at Z, and (2) at a second relatively higher temperature, to communicate a control fluid pressure to maintain the fluid delivery rate of the pump at X, over substantially the entire range of operating engine speeds.

DESCRIPTION OF THE PREFERRED EMBODIMENTS

Figure 1:
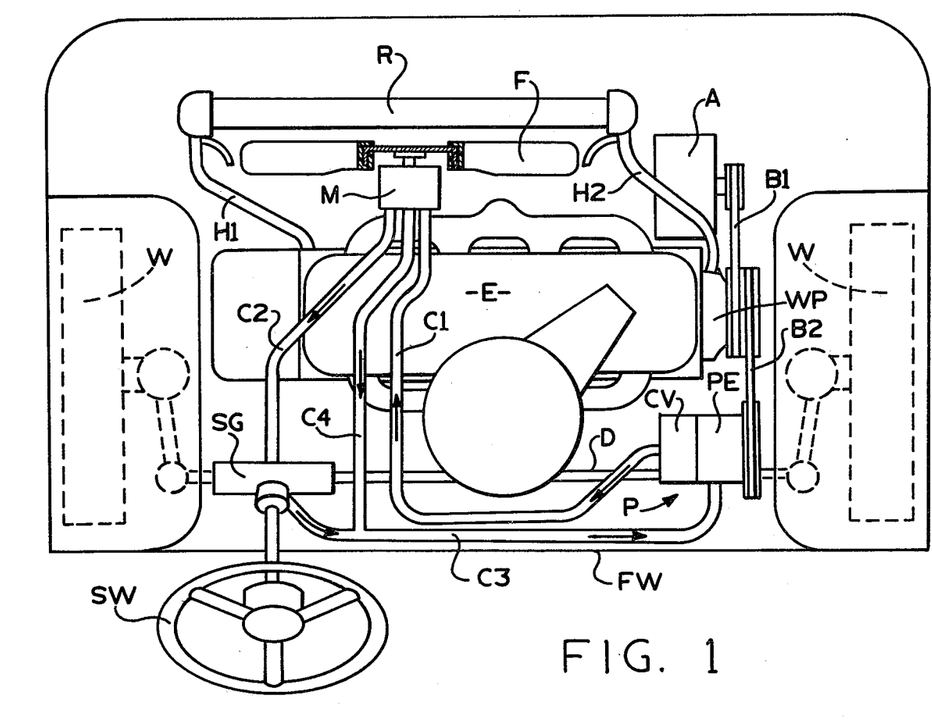
FIG. 1 is a somewhat schematic top plan view of the engine compartment of a vehicle utilizing a hydraulic fan drive system in accordance with the present invention.

Referring now to the drawings, which are not intended to limit the invention, FIG. 1 is a somewhat schematic top view plan of the engine compartment of a vehicle utilizing the present invention. Transversely disposed within the compartment is a vehicle engine E including means (not shown) for transmitting torque to a pair of groundengaging front wheels W. Disposed adjacent the right-hand end of the engine E and driven thereby is a water pump WP including a pair of pulleys, one of which drives a V-belt which drives the alternator A, and the other of which drives a V-belt B2 which drives a variable displacement power steering pump assembly P, which includes a pumping element PE and a pump displacement control valve CV. As is well known in the art, the input to the power steering pump is at a speed having a certain, fixed relationship to engine speed, depending upon the ratio of the pulleys which are interconnected by the belt B2.

Disposed adjacent the forward portion of the vehicle engine compartment is a radiator R. A hose H1 communicates relatively hot water from the engine E to the top tank of the radiator R, while a second hose H2 communicates relatively cooler water from the radiator bottom tank to the engine water pump WP.

Situated in its normal location, just ahead of the fire wall FW is an open-center, hydraulic booster-type steering gear mechanism SG of the type commonly used, which is responsive to the rotation of a steering wheel SW to transmit a steering force to a drag link D.

The power steering pump P generates a flow of pressurized fluid which is communicated by means of a conduit C1 to a hydraulic fan motor M to which is operably attached a radiator cooling fan F. Some of the fluid leaving the motor M is communicated by conduit C2 to the open-center steering gear mechanism SG and from the steering gear SG back to the pump P by means of a conduit C3. Alternatively, fluid may flow from the motor M by means of a conduit C4 which bypasses the steering gear SG and communicates with the conduit C3.

Figure 2:
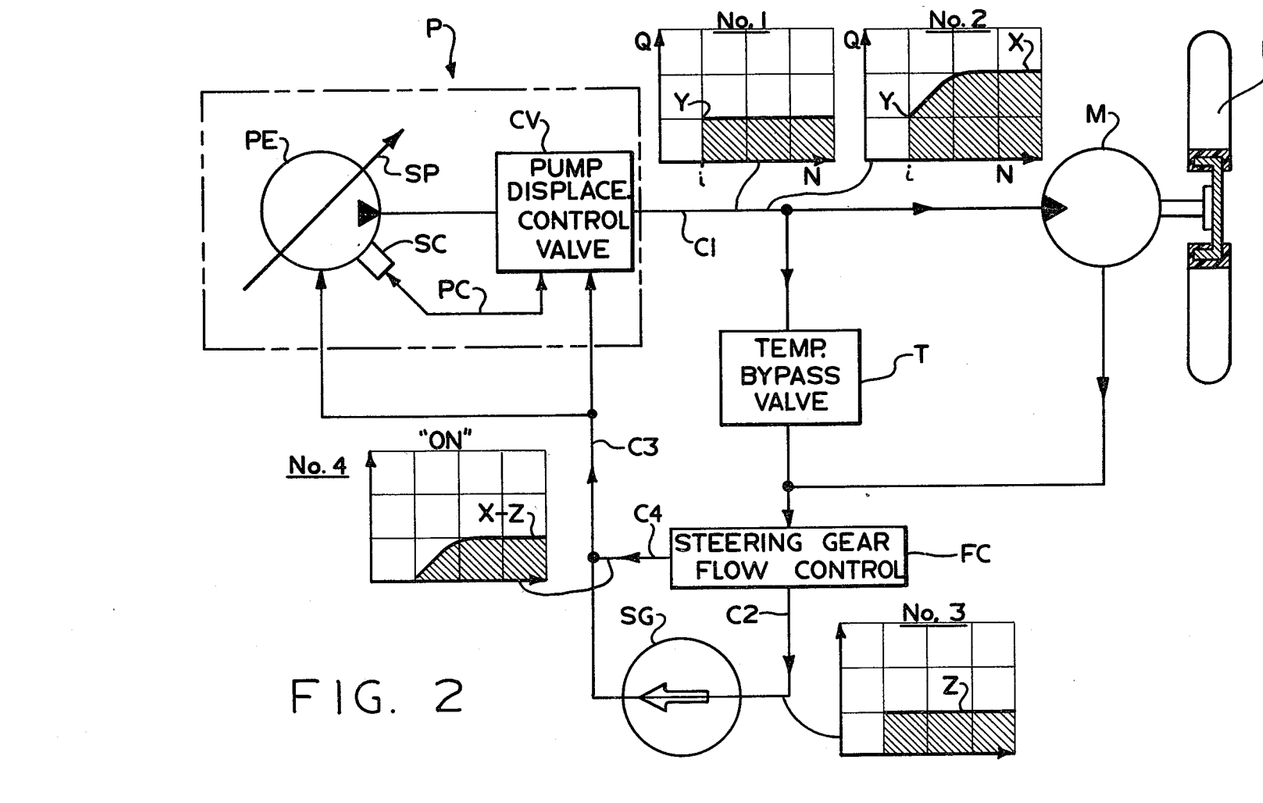
FIG. 2 is a hydraulic schematic of a fan drive system in accordance with the present invention.

Referring now to FIG. 2, which is a hydraulic schematic, the general arrangement and operation of the hydraulic fan drive system of the present invention will be described. In order to provide a better understanding of the invention, various portions of the schematic of FIG. 2 have associated therewith a graph of flow (Q) versus speed (N), i.e., the engine speed or pump input speed. It should be noted that the graphs do not include numbers indicating specific flow quantities or specific speeds, but are intended merely to indicate relative flow quantities for purposes of describing the invention schematically and conceptually. However, it should also be noted that the graphs cover what will be referred to hereinafter as the "range of operating engine speeds", i.e., speeds ranging from approximately engine idle up to an engine speed corresponding to a typical vehicle cruising speed, such as 55 mph.

As is shown in greater detail in FIG. 2, the variable displacement power steering pump assembly P has the pump displacement control valve CV connected in series with the variable displacement pumping element PE, and downstream therefrom. The pumping element PE includes a movable swashplate SP, the movement of which is controlled in a well known manner by a stroking cylinder SC. The stroking cylinder SC is in fluid communication with the displacement control valve CV by means of a pressure signal conduit PC. Although in the preferred embodiment, the pumping element PE is preferably an axial piston unit, it should be apparent to those skilled in the art that within the scope of the invention, the term "variable displacement pump" and similar terms are meant to include any pumping arrangement in which the ratio of output flow to input speed can be changed, or varied, either selectively or automatically. Furthermore, the system of the present invention may be closed loop, open loop, or a combination thereof.

Referring still to FIG. 2, one important aspect of the present invention is the operation of the pump displacement control valve CV as it relates to the pumping element PE and to the remainder of the hydraulic fan drive system. The general function of the control valve CV will be described in connection with FIG. 2, whereas the structure and function of several preferred embodiments of the control valve CV will be described in greater detail in connection with FIGS. 3 and 5.

The output of the variable pump assembly P, which is the sole source of pressurized fluid for the system, is communicated by means of the fluid conduit C1 to a parallel combination of the hydraulic fan motor M and a temperature bypass valve T. Downstream from the point at which the outputs from the fan motor M and bypass valve T recombine, all of the system fluid flows to a steering gear flow control FC. Although not an essential feature of the present invention, it is preferable that the bypass valve T and steering gear flow control FC be integral with the fan motor M as is disclosed and claimed in copending U. S. application Ser. Nos. 907,064 (filed May 18, 1978 for a HYDRAULIC FAN DRIVE SYSTEM), and 966,984 (filed Dec. 6, 1978 for a MOTOR VALVE APPARATUS FOR HYDRAULIC FAN DRIVE SYSTEM), both of which were filed in the name of Edward J. Goscenski Jr., assigned to the assignee of the present invention, and are incorporated herein by reference.

Both the pump displacement control valve CV and the temperature bypass valve T include, and are controlled by, some form of mechanism which is responsive to the demand for engine cooling. For example, the mechanism could be directly responsive to engine coolant temperature, or could be a device such as a phase-change power pill which responds to changes in ambient air temperature within the engine compartment. In addition, various other arrangements which are well known in the art could be utilized to provide responsiveness to demand for cooling.

Referring still to FIG. 2, it may be seen that there are two graphs associated with the pump output flow through the conduit C1. Graph No. 1 represents system flow with no demand for cooling. At engine idle (i), and maximum displacement, the flow through the conduit C1 is at a rate of Y, and as engine speed increases, the displacement of the pumping element PE is progressively decreased, such that the flow through the conduit C1 remains at Y. Graph No. 2 illustrates the system fluid flow when a demand for cooling is sensed. Again, at engine idle and maximum pump displacement, fluid flow through the conduit C1 is at a rate of Y. As engine speed increases, pump displacement remains relatively constant, and the pump outout increases proportional to engine speed, until the pump output reaches a rate of X. As the engine speed contunues to increase, the pump displacement progressively decreases to maintain the flow through the conduit C1 at a rate of X. As is illustrated in Graphs No. 1 and No. 2, the flow rate X is substantially greater than the flow rate Y. By way of example only, and assuming that all fluid in conduit C1 flows through the fan motor M, the flow rate Y may be about 2 gpm, and the flow rate X may be about 4 gpm. Based upon these flow rates, the fan motor M may typically be sized such that the flow rate Y results in a fan speed of about 1,000 rpm, whereas a flow rate of X would result in a fan speed of about 2,000 rpm. Thus, when the flow rate is Y, the fan motor M is referred to as being "disengaged", whereas when the flow rate is X, the fan motor M is referred to as being "engaged".

As mentioned above, both the output from the fan motor M and the output from the temperature bypass valve T recombine and flow into the steering gear flow control FC, such that regardless of the need for cooling, the input to the flow control FC may be represented by a flow curve of the type shown in Graph No. 2. The purpose of the steering gear flow control FC is to provide to the steering gear mechanism SG the required quantity of fluid. As is well known to those skilled in the art, the conventional automotive steering gear mechanism is of the open-center type, such that the steering gear is designed to have a generally constant flow rate therethrough, with the fluid pressure being dependent upon the steering load. Conventional steering mechanisms have been open-center, partly to permit the use of a fixed displacement power steering pump, the least expensive type of pump. However, the inclusion of the steering gear flow control FC in the present invention effectively makes the overall system open-center, even if a closed-center steering gear were substituted for the conventional open-center steering gear. Therefore, it is within the scope of the present invention to use a closed-center steering gear mechanism, in which case, the steering flow control FC would direct fluid to the steering gear only in response to a "demand" for fluid. Accordingly, it is a feature of the present invention that the system includes a steering gear flow control FC capable of communicating a fluid flow rate of approximately Z (Graph No. 3) to the steering gear over the entire range of operating engine speeds, the flow rate Z being substantially less than the flow rate X.

Although Graph No. 3 illustrates the flow rate Z as being constant, it should be appreciated that the flow rate Z could vary somewhat from that shown. In the subject embodiment, the system components are sized such that the flow rate Y from the pump P at engine idle is substantially identical to the flow rate Z, although, within the scope of the present invention the flow rate Y may be somewhat greater than or less than the flow rate Z. The steering gear flow control FC is operable to communicate substantially all fluid flow in excess of Z (Graph No. 4) through the conduit C4 to bypass the steering gear, and recombine with the fluid leaving the steering gear by means of the conduit C3. Thus, it may be seen that the present invention makes it possible to drive a hydraulic fan motor and operate a hydraulic steering gear in series, with each of the fan motor and the steering gear receiving the quantity of fluid appropriate for its respective operation, independent of the other.

Figure 3:
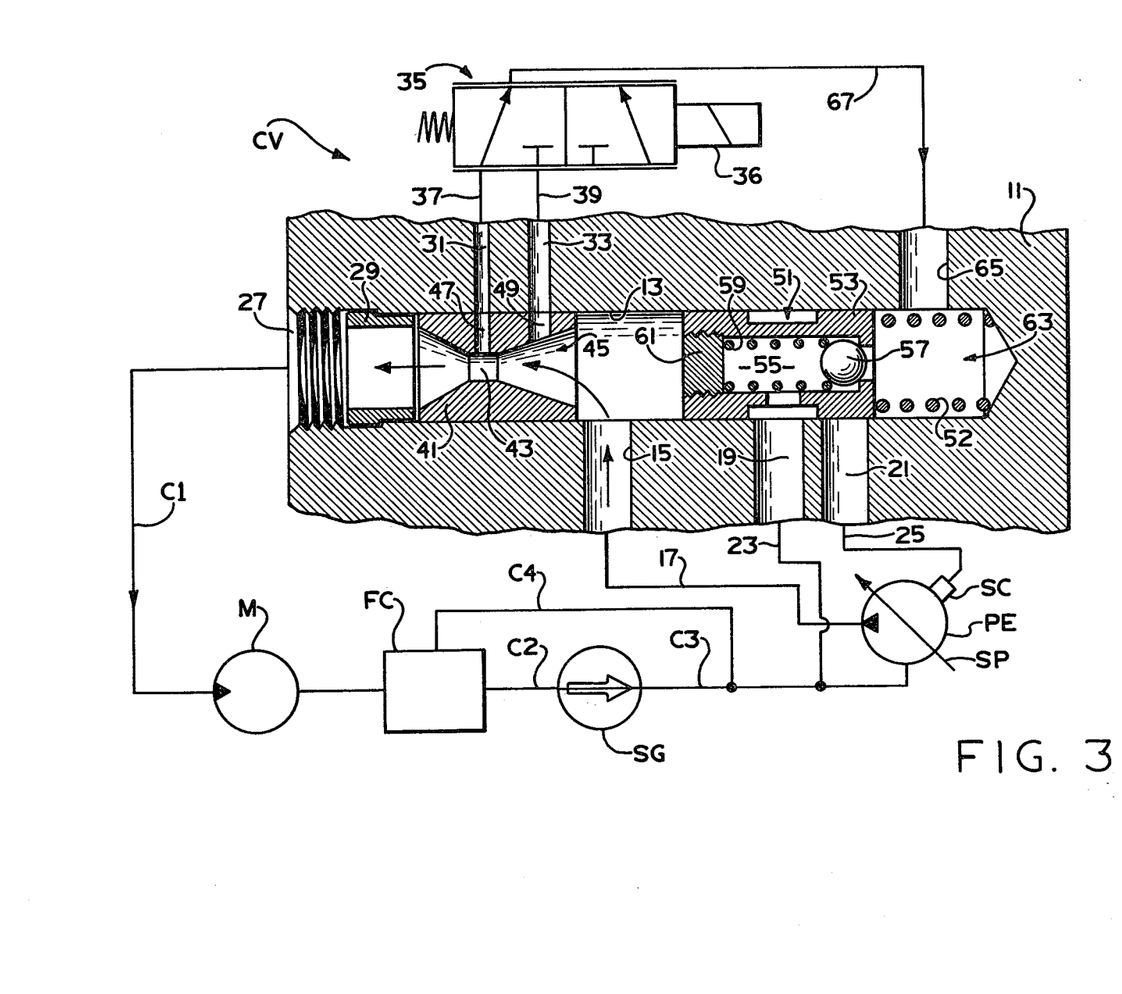
FIG. 3 is a view, partly in hydraulic schematic, including a fragmentary cross section of the pump displacement control valve of the present invention.

Control Valve CV—FIG. 3

Referring now to FIG. 3, there is shown in some detail a preferred embodiment of the pump displacement control valve CV, shown schematically in FIGS. 1 and 2. The pump displacement control valve CV includes a valve housing 11 which defines a main axial valve bore 13. In fluid communication with the valve bore 13 is a fluid inlet passage 15 in fluid communication with the fluid outlet of the pumping element PE by means of a fluid conduit 17. The valve housing 11 defines a pair of axially spaced fluid passages 19 and 21 in fluid communication with the valve bore 13. The fluid passage 19 communicates with the inlet of the pumping element PE (or with the fluid reservoir) by means of a fluid conduit 23, and the fluid passage 21 communicates with the stroking cylinder SC by means of a fluid conduit 25.

At the left end of the valve bore 13 is a threaded outlet port 27 which is in fluid communication with the hydraulic fan motor M by means of the conduit C1. Disposed within the valve bore 13, adjacent the outlet port 27, is a deformable fitting 29 which sealingly engages a fitting (not shown) attached to the upstream end of the conduit C1 when the fitting is threaded into the outlet port 27. The valve housing 11 further defines a pair of signal passages 31 and 33 which are connected to the inlet ports of a pilot valve, generally designated 35 by a pair of signal conduits 37 and 39, respectively. The position of the pilot valve 35 is controlled by an electrical solenoid 36, or by any other suitable means, for example, a phase-change power pill. Disposed within the valve bore 13 is an orifice member 41 which defines a flow control orifice 43 and an inlet portion 45. The orifice member 41 also defines a pair of radial signal passages 47 and 49, the passage 47 communicating the pressure in the orifice 43 to the signal passage 31, and the passage 49 communicating the pressure in the inlet portion 45 to the signal passage 33.

Also disposed within the valve bore 13 is a spool member generally designated 51, which includes a metering land 53. The spool member 51 defines an axial bore 55, and adjacent the right end thereof is a valve seat against which a relief valve member 57 is biased by means of a spring member 59. The spring member 59 is seated at its left end against an adjustable seat member 61 which is in threaded engagement with the spool member 51. The spool member 51 cooperates with the right end portion of the valve bore 13 to define a signal chamber 63. The valve housing 11 further defines a third signal passage 65 which is in fluid communication with the signal chamber 63, and with the outlet port of the pilot valve 35, by means of a fluid conduit 67.

In describing the operation of the system of the present invention, and particularly the displacement control valve CV, it should first be noted that the pumping element PE is preferably of the type in which the swashplate SP is spring biased to a slight displacement, and in which the displacement of the swashplate SP increases with increasing fluid pressure in the stroking cylinder SC. Assuming first the need for only minimum cooling and fan speed, the solenoid 36 is de-energized, such that the pilot valve 35 is in the position shown in FIG. 3. The fluid output from the pumping element PE flows through the conduit 17, through the inlet passage 15 into the valve bore 13 (see arrows), then flows through the orifice member 41 toward the outlet port 27. As is well known to those skilled in the art, as fluid flows through an orifice member such as the member 41, the fluid pressure is higher in the inlet portion 45 than it is in the orifice 43, where the fluid velocity is greatest. Therefore, with the pilot valve 35 in the position shown, the relatively lower signal pressure in the orifice 43 is communicated by the passages 47 and 31 and the conduit 37 to the pilot valve 35, then by the conduit 67 and passage 65 to the signal chamber 63. With relatively lower pressure in the signal chamber 63, the fluid pressure acting on the left end of the spool member 51 momentarily moves the spool member slightly to the right of the position shown in FIG. 3, such that the metering land 53 is effective to meter fluid between the chamber 63, the fluid passage 21, and the fluid passage 19. As a result, the fluid pressure in the stroking cylinder SC is maintained at such a level that the fluid delivery rate of the pumping element PE is maintained at the relatively lower flow rate Y (or Z) as shown in Graph No. 1, FIG. 2. Assuming now that the need for maximum cooling is sensed, the solenoid 36 is energized to move the pilot valve 35 from the position shown in FIG. 3 to the extreme lefthand position in which communication between the passage 39 and the conduit 67 is provided. With the pilot valve 35 in the position described, the relatively higher fluid pressure in the inlet portion 45 of the orifice member 41 is communicated through the passages 49 and 33, through the conduit 39 to the pilot valve 35, then by the conduit 67 and the signal passage 65 to the signal chamber 63. The relatively greater instantaneous fluid pressure in the signal chamber 63, aided by the force of the spring member 52, biases the spool member 51, in opposition to the fluid pressure acting on the left end of the spool member 51, to a position slightly to the left of that shown in FIG. 3. In this position of the spool member 51, the metering land 53 still meters pressurized fluid between the signal chamber 63, the fluid passage 21, and the fluid passage 19, but now does so in such a manner to maintain a relatively greater fluid pressure in the stroking cylinder SC. The result of this relatively greater fluid pressure in the stroking cylinder SC is that the displacement of the swashplate SP is maintained at a position such that the fluid flow rate of the pumping element PE is maintained at the relatively higher flow rate X as shown in Graph No. 2, FIG. 2. It will be understood by those skilled in the art that with the pilot valve 35 in the lefthand position just described, greater flow from the pumping element PE is required to maintain the same pressure differential across the spool member 51 as in the case of the minimum cooling condition described previously.

Figure 4A:
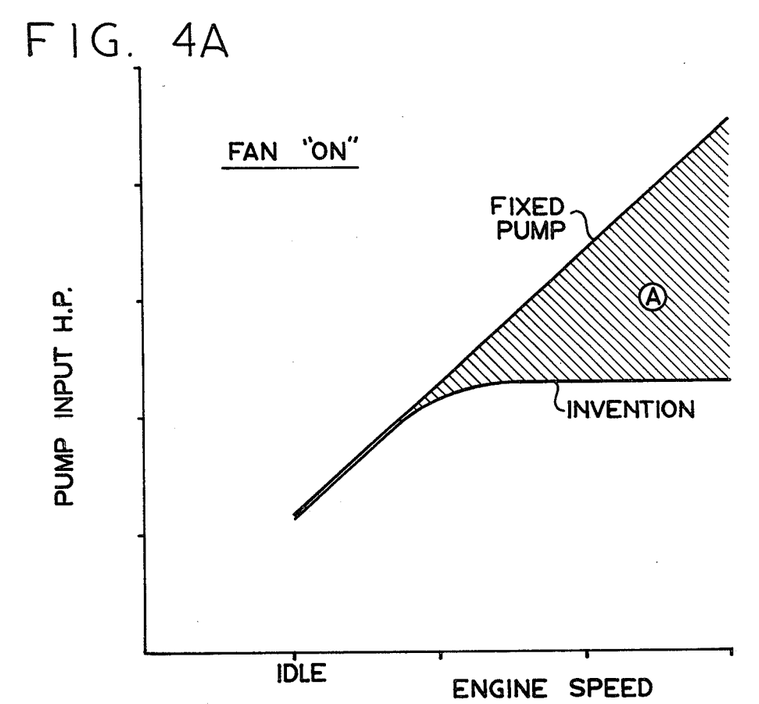
FIGS. 4A and 4B are graphs of pump input horsepower vs. engine speed, illustrating the horsepower savings achieved by the use of the present invention.
Figure 4B:
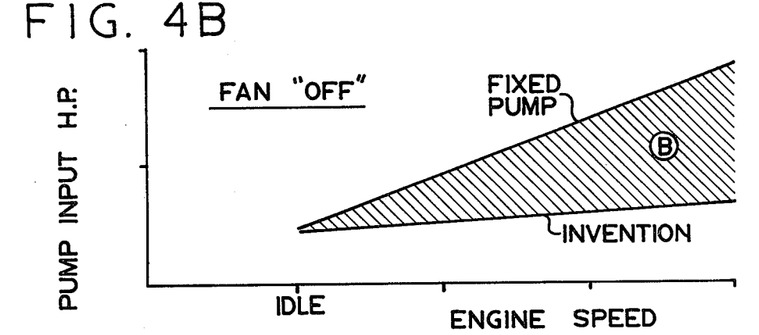

Referring now to the graph of FIG. 4, which is a graph of pump input horsepower vs. engine speed, the primary advantage of the present invention will be illustrated. In hydraulic fan drive systems known prior to the present invention, which have normally utilized fixed displacement pumps, the graph of horsepower vs. speed is represented by the straight, dashed line. Utilizing the present invention, and maintaining the output of the pumping element at the flow rate X (FIG. 4A), it may be seen that there is a savings of horsepower proportional to the shaded area labeled "A". More importantly, because in most vehicles the fan operates at the minimum fan speed as much as 80 or 90 percent of the time, the use of the present invention provides a savings of horsepower during such operation at minimum fan speed, proportional to the shaded area labeled "B" (FIG. 4B).

Referring again to FIG. 3, it should be noted that the pilot valve 35 is shown schematically as being variable between the two extreme positions, thus being responsive to a demand for cooling which is somewhere between the minimum and the maximum. When such an intermediate demand for cooling is sensed, and the pilot valve 35 is moved by partial energization of the solenoid 36 to an intermediate, or modulating position, the resulting fluid pressure in the signal chamber 63 is somewhere between the pressure in the control orifice 43 and the pressure in the inlet portion 45. In this intermediate condition, the metering land 53 may instantaneously be approximately centered relative to the instantaneous positions described previously, to maintain the fluid pressure in the stroking cylinder SC at a level such that the displacement of the swashplate SP is maintained at a position in which the fluid flow rate of the pumping element PE is kept at the desired intermediate flow rate between the flow rate X and the flow rate Y. It will be appreciated from the foregoing description that in such an intermediate condition, the savings of horsepower is somewhere between those represented by the area "B" and the area "A".

Figure 5:
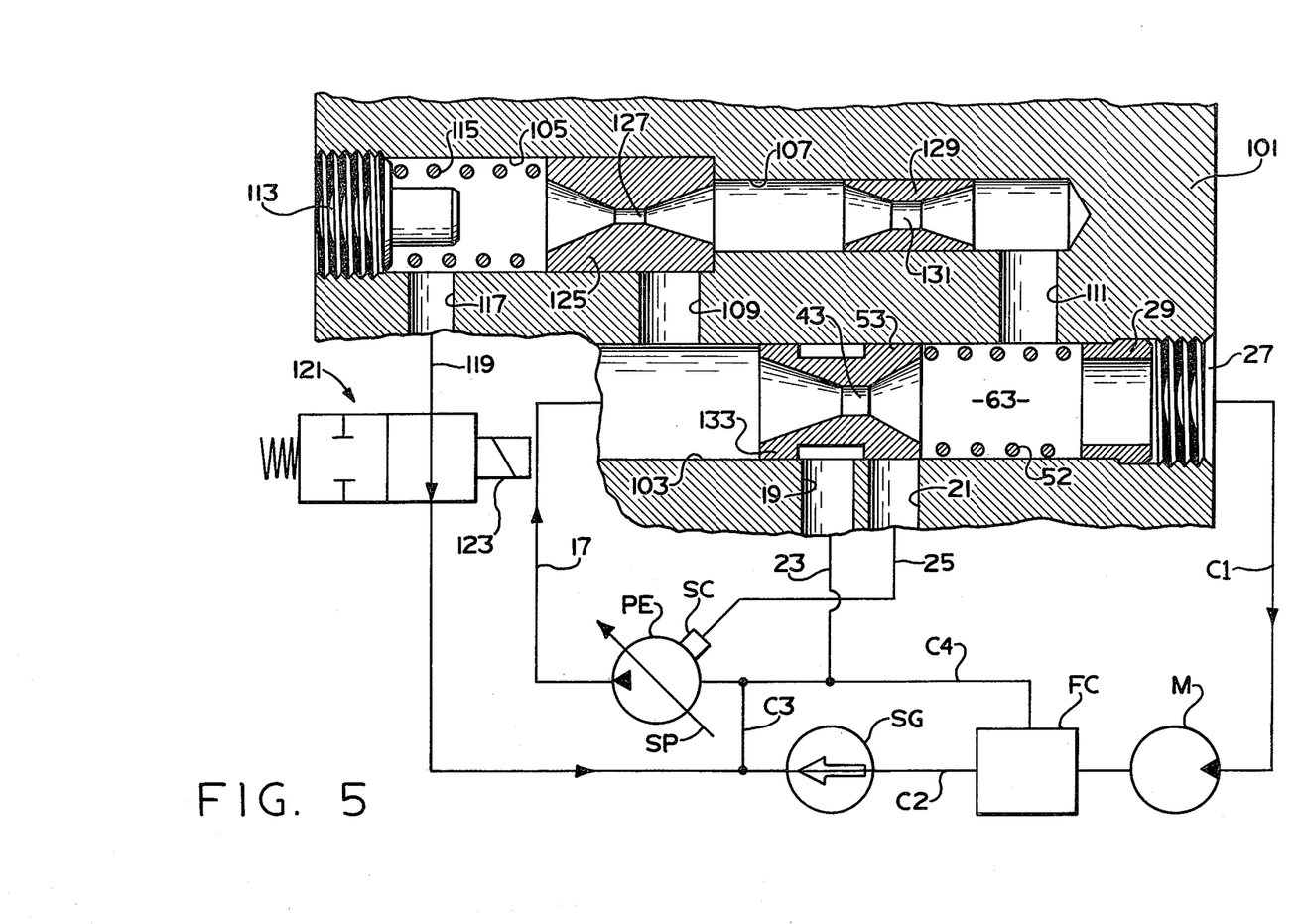
FIG. 5 is a view, partly in hydraulic schematic, including a fragmentary cross section of an alternative embodiment of the pump displacement control valve of the present invention.

Control valve CV—FIG. 5

Referring now to FIG. 5, there will be described an alternative embodiment of the present invention which functions in a manner somewhat similar to the FIG. 3 embodiment, and provides exactly the same flow versus speed relationships illustrated in the Graph of FIG. 4.

In the FIG. 5 embodiment, elements which are functionally or structurally the same as in the FIG. 3 embodiment bear the same reference numerals, while elements which are new or substantially changed bear numerals in excess of 100. In FIG. 5, a valve housing 101 defines a main axial bore 103 which receives pressurized fluid from the conduit 17. The valve housing 101 further defines a stepped bore including a larger bore portion 105, and a smaller bore portion 107. The bore portion 105 is in communication with the valve bore 103 by means of a fluid passage 109, while the bore portion 107 is in fluid communication with the chamber 63 by means of a fluid passage 111. The bore portion 105 is sealed, at its left end in FIG. 5, by a threaded plug member 113, which also serves as the seat for a compression spring 115. The valve housing 101 defines a fluid passage 117 which permits fluid communication between the bore portion 105 and a conduit 119. Disposed within the conduit 119 is a pilot valve 121, controlled by a solenoid 123 between the position shown in FIG. 5 permitting communication from the passage 117, through the conduit 119 to the conduit C3, and a position blocking such communication.

Disposed within the bore portion 105, and biased by the spring 115 toward the closed, righthand position shown in FIG. 5 is a movable valve member 125 defining a pressure differential orifice 127. Disposed within the smaller bore portion 107 is an orifice member 129 defining a flow control orifice 131. The function of the orifices 127 and 131 will be described subsequently. The orifice member 129 is preferably press-fit into the bore portion 107 to prevent movement therein.

Slidably disposed with the valve bore 103 is a spool member 133, defining the flow control orifice 43, and including the metering land 53. The spool member 133 is biased toward the right in FIG. 5 by fluid pressure entering the valve bore 103, and is biased to the left in FIG. 5 by the spring 52 and the fluid pressure in the chamber 63, i.e., the fluid pressure downstream of the orifice 43.

In describing the operation of the FIG. 5 embodiment of the invention, it will first be assumed that the need is sensed for only minimum fan speed (flow rate Y), such that the solenoid 123 is de-energized, shifting the pilot valve 121 to the righthand position, blocking fluid communication through the conduit 119. In the described condition, with no fluid flow through the passage 117 and conduit 119, there is no pressure differential across the orifice 127, and the valve member 125 remains in the closed position shown in FIG. 5, blocking communication between the bore portion 107 and the fluid passage 109. The entire output of the pumping element PE flows through the conduit 17 and the valve bore 103, then through the flow control orifice 43 and the outlet port 27 to the conduit C1. With all of the flow following the path described above, the pressure differential across the control orifice 43 positions the spool member 133 such that the metering land 53 meters fluid communication between the fluid passage 21, the fluid passage 19, and the fluid pressure in the stroking cylinder SC is maintained at such a level that the fluid delivery rate of the pumping element PE is maintained at the relatively lower flow rate Y.

Assuming now that the need for maximum cooling is sensed, the solenoid 123 is energized to move the pilot valve 121 to the position shown in FIG. 5, permitting a portion of the fluid in the main flow path to flow through the fluid passage 111 and through the bore portion 107 and control orifice 131, through the pressure differential orifice 127, then through the fluid passage 117 and conduit 119 to the conduit C3 and back to the inlet of the pumping element PE. This flow results in a pressure drop across the differential orifice 127 sufficient to bias the valve member 125 to the left in FIG. 5 to a position permitting substantially unrestricted fluid communication from the fluid passage 109 to the bore portion 107. Fluid entering the bore portion 107 flows to the right in FIG. 5, through the flow control orifice 131, then through the fluid passage 111 into chamber 63, recombining with the fluid flowing through the orifice 43.

When the output of the pump entering the valve bore 103 is divided as described above, there is initially a lower pressure drop across the orifice 43, resulting in leftward movement of the spool member 133 to permit greater metering by the land 53 of fluid from the chamber 63 to the fluid passage 21 to increase the fluid pressure in the stroking cylinder SC. The fluid pressure in the stroking cylinder SC will increase until the displacement of the swashplate SP is in a position such that the total fluid output of the pumping element PE is sufficient to produce the same pressure drop across the orifice 43 as existed when the fluid flow rate of the pumping element PE was being maintained at the flow rate Y. It will be understood by those skilled in the art that the relationship between the flow rate Y and the flow rate X will be determined by the relationship between the size of the control orifice 43 and the size of the control orifice 131. For example, if the orifices 43 and 131 are the same size, the flow rate X will be twice the flow rate Y. If the area of the orifice 131 is greater than the area of the orifice 43, the flow rate X will be more than twice the flow rate Y, etc. As was described in connection with the FIG. 3 embodiment, the pilot valve 121 could be modulated between the two extreme positions, with the same end result as in the FIG. 3 embodiment.

In the preferred embodiments of the present invention, the variable displacement power steering pump P is described as being of the variable swashplate, axial piston type in which displacement of the pumping element PE, and thus fluid output, may be varied by movement of the swashplate SP. It should be understood, however, that the scope of the present invention is not limited to any particular type or configuration of power steering pump and it is an essential feature of the present invention only that the pumping element be operable to deliver fluid at a rate which is generally proportional to engine speed for any given displacement, and that the pumping element have at least two different output-input ratios, and that the selection between those ratios be in response to different fluid pressures in a fluid pressure actuated device.

The invention has been described in detail sufficient to enable one of ordinary skill in the art to make and use the same. Other modifications and alterations of the preferred embodiments will occur to those skilled in the art upon a reading and understanding of the specification, and it is my intention to include all such alterations and modifications as part of my invention, insofar as they come within the scope of the appended claims.

I claim:

1. A vehicle engine cooling and steering gear drive system comprising:
    (a) an engine driven variable displacement pump including a pumping element operable to deliver fluid at a rate generally proportional to engine speed for any given displacement, said pump having fluid inlet and outlet ports and including fluid pressure actuated means to vary the displacement of said pump, said pump comprising the sole source of pressurized fluid for said system and having a fluid delivery rate of at least Z at engine idle and maximum pump displacement;
    (b) a hydraulic fan motor having fluid inlet and outlet ports, said fluid inlet port being in series fluid communication with said pump outlet port, said fan motor having a fan speed at engine idle corresponding to a fluid flow rate of approximately Y, and a fan peak speed corresponding to a fluid flow rate of approximately X;
    (c) bypass valve means connected in parallel with said fan motor, operable to bypass said fan motor and being responsive to the need for cooling, said bypass valve means being capable of bypassing at least a substantial portion of Y at a first relatively lower temperature and capable of substantially preventing bypass flow at a second relatively higher temperature;

(d) flow control valve means having its inlet in fluid communication with said outlet port of said fan motor and with said bypass flow, said flow control valve means having primary and secondary fluid outlets and being operable to communicate a fluid flow rate of approximately Z from said fluid inlet to said primary outlet over substantially the entire range of operating engine speeds and to communicate substantially all fluid flow in excess of Z from said inlet to said secondary outlet, Z being substantially less than X;

(e) an open-center steering gear mechanism having inlet and outlet ports, said inlet port being in fluid communication with said primary outlet of said flow control valve means, said outlet port of said steering gear mechanism and said secondary outlet of said flow control valve means being in fluid communication with said fluid inlet port of said pump; and (f) control valve means in fluid communication with said fluid outlet port of said pump and being operable to communicate a control fluid pressure to said pressure actuated means of said pump, said control valve means including valve means responsive to demand for cooling and being operable (1) at said first relatively lower temperature to communicate a control fluid pressure to maintain the fluid delivery rate of said pump at Y and (2) at said second relatively higher temperature to communicate a control fluid pressure to maintain the fluid delivery rate of said pump at X, over substantially the entire range of operating engine speeds.

2. A vehicle engine cooling and steering gear drive system comprising:
(a) an engine driven variable displacement pump including a pumping element operable to deliver fluid at a rate generally proportional to engine speed for any given displacement, said pump having fluid inlet and outlet ports and including fluid pressure actuated means to vary the displacement of said pump, said pump comprising the sole source of pressurized fluid for said system and having a fluid delivery rate of at least Z at engine idle and maximum pump displacement;
(b) a hydraulic fan motor having fluid inlet and outlet ports, said fluid inlet port being in series fluid communication with said pump outlet port, said fan motor having a fan speed at engine idle corresponding to a fluid flow rate of approximately Y, and a fan peak speed corresponding to a fluid flow rate of approximately X;
(c) flow control valve means having its inlet in fluid communication with said outlet port of said fan motor, said flow control valve means having primary and secondary fluid outlets and being operable to communicate a fluid flow rate of approximately Z from said fluid inlet to said primary outlet over substantially the entire range of operating engine speeds and to communicate substantially all fluid flow in excess of Z from said inlet to said secondary outlet, Z being substantially less than X;
(d) a steering gear mechanism having inlet and outlet ports, said inlet port being in fluid communication with said primary outlet of said flow control valve means, said outlet port of said steering gear mechanism and said secondary outlet of said flow control valve means being in fluid communication with said fluid inlet port of said pump; and
(e) control valve means in fluid communication with said fluid outlet port of said pump and being operable to communicate a control fluid pressure to said pressure actuated means of said pump, said control valve means including valve means responsive to demand for cooling and being operable (1) at a first relatively lower temperature to communicate a control fluid pressure to maintain the fluid delivery rate of said pump at Y and (2) at a second relatively higher temperature to communicate a control fluid pressure to maintain the fluid delivery rate of said pump at X, over substantially the entire range of operating engine speeds.

3. A drive system as claimed in claim 1 or 2 wherein said control valve means defines a valve bore in fluid communication with said fluid outlet port of said pump, a first fluid passage communicating between said valve bore and a source of low pressure fluid, and a second fluid passage communicating between said valve bore and said fluid pressure actuated means, a movable valve member disposed in said valve bore and being movable between a first position permitting fluid communication from said second fluid passage to said first fluid passage, and a second position permitting fluid communication from said valve bore to said second fluid passage.

4. A drive system as claimed in claim 3 wherein said control valve means includes means defining a fixed, main flow control orifice through which substantially the entire fluid delivery of said pump can flow.

5. A drive system as claimed in claim 4 wherein said main flow control orifice is defined by an orifice member, said orifice member having a varying cross sectional flow area along its axis, said movable valve member being movable in response to a pressure differential across said valve member.

6. A drive system as claimed in claim 5 wherein said pressure differential comprises the difference between the fluid pressure at said outlet port of said pump and a second fluid pressure representative of a fluid pressure within said main flow control orifice.

7. A drive system as claimed in claim 6 wherein said orifice member defines first and second pressure passages in fluid communication with said flow control orifice, said first and second pressure passages being axially disposed and containing fluid at first and second different pressures, said valve means responsive to demand for cooling being operable to communicate said first pressure passage to said valve bore at said first relatively lower temperature and to communicate said second pressure passage to said valve bore at said second relatively higher temperature.

8. A vehicle engine cooling and steering gear drive system comprising:
(a) an engine driven variable displacement pump including a pumping element operable to deliver fluid at a rate generally proportional to engine speed for any given displacement, said pump having fluid inlet and outlet ports and including fluid pressure actuated means to vary the displacement of said pump, said pump comprising the sole source of pressurized fluid for said system and having a fluid delivery rate of at least Z at engine idle and maximum pump displacement;
(b) a hydraulic fan motor having fluid inlet and outlet ports, said fluid inlet port being in series fluid communication with said pump outlet port, said fan motor having a fan speed at engine idle corresponding to a fluid flow rate of approximately Y, and a fan peak speed corresponding to a fluid flow rate of approximately X;
(c) flow control valve means having its inlet in fluid communication with said outlet port of said fan motor, said flow control valve means having primary and secondary fluid outlets and being operable to communicate a fluid flow rate of approximately Z from said fluid inlet to said primary outlet over substantially the entire range of operating engine speeds and to communicate substantially all fluid flow in excess of Z from said inlet to said secondary outlet, Z being substantially less than X;
(d) a steering gear mechanism having inlet and outlet ports, said inlet port being in fluid communication with said primary outlet of said flow control valve means, said outlet port of said steering gear mechanism and said secondary outlet of said flow control valve means being in fluid communication with said fluid inlet port of said pump; and
(e) control valve means defining a valve bore in fluid communication with said fluid outlet port of said pump and main flow control orifice means, a movable valve member disposed in said valve bore, and being operable to control the control fluid pressure in said pressure actuated means, said valve member being positioned in accordance with a control pressure differential representative of the pressure differential across said main flow control orifice means, said control valve means including pilot valve means responsive to the demand for cooling and being operable to maintain said control pressure differential substantially constant, whereby (1) at a first relatively lower temperature, the fluid delivery rate of said pump is maintained at Y and (2) at a second relatively higher temperature, the fluid delivery rate of said pump is maintained at X, over substantially the entire range of operating engine speeds, said pilot valve means being operable, in response to a change between said first and second temperatures, to vary instantaneously said control pressure differential to cause a change in the fluid delivery rate of said pump between Y and X, respectively, thereby re-establishing said control pressure differential.

* * * * *